Patented May 11, 1954

2,678,259

UNITED STATES PATENT OFFICE 2,678,259

CHLORINE PRODUCTION BY OXIDIZING HYDROGEN CHLORIDE EMPLOYING UN-GLOWED CHROMIC OXIDE CATALYST MATERIAL

Robert G. Banner and Tom S. Perrin, Painesville, Ohio, assignors to Diamond Alkali Company, Cleveland, Ohio, a corporation of Delaware No Drawing. Application August 27, 1949, Serial No. 112,830

9 Claims. (Cl. 23—219)

This invention relates to a method for the oxidation of hydrogen chloride to elemental chlorine and water, and more particularly relates to the use of a specific physical form of chromic oxide in such method.

The state of the art

The need for a method for the oxidation of hydrogen chloride to chlorine on a commercial scale has long existed. Prior to the discovery of suitable means for the electrolysis of salt brines to produce chlorine, the need was particularly intense. More recently, as facilities for the electrolytic production of chlorine have expanded and as chlorine has become a common and widely used reagent in the commercial synthesis of a myriad of organic chemicals, the problem of disposal of by-product hydrogen chloride has again become of paramount importance. The most desirable disposal of this compound is to reclaim its chlorine content as elemental chlorine, but a commercially suitable method for such reclamation has not heretofore been available to meet the need.

The proposed commercial process of Deacon, in which copper chloride is employed as a catalyst for the oxidation of hydrogen chloride, has long since fallen into disuse principally because of the volatility of the catalyst at the temperatures at which the reaction takes place and the attendant difficulty of continuously maintaining sufficient catalyst in the reaction zone. Processes employing other less volatile metal oxides have met with less commercial success than the process of Deacon. For example, it has heretofore been proposed to oxidize hydrogen chloride to elemental chlorine and water, using atmospheric oxygen as the oxidizing agent and "sesquioxide of chrome" or chromic oxide ($Cr_2O_3$) as the oxidation catalyst. In the description of one such process, the author states that compounds of chromium which are convertible to the sesquioxide of chrome are suitable. Particular compounds of chromium noted in the proposed process include bichromate of potash deposited upon pumis, "chromochre, chromite, sidero, chrome, etc., may be employed, or the alkaline or metallic chromates or chromites, etc." A more recent proposal for the oxidation of hydrogen chloride to chlorine employing atmospheric oxygen as the oxidizing agent and chromic oxide deposited upon an inert substrate as the oxidation catalyst, requires that the particular oxide of chrome employed therein be exposed to atmospheric oxygen at temperatures within the range of 500° to 1200° F. (260°–650° C.) until the chromium oxide catalyst becomes "activated," whereupon the flow of atmospheric oxygen over the catalyst is terminated and gaseous hydrogen chloride is then passed thereover, while maintaining the temperature within the above noted range until the catalyst becomes "deactivated," at which time the flow of hydrogen chloride over the catalyst material is terminated and the cycle is repeated.

Investigation of both of these prior art methods reveals that in the first method, the yield of elemental chlorine obtained is so low that the method is substantially economically impossible in terms of modern industrial efficiency requirements. The second method is not substantially better than the first method in that the capacity of a given production unit to oxidize hydrogen chloride to chlorine is also extremely low. For example, while a relatively high conversion of hydrogen chloride to chlorine is obtained momentarily during the flow of hydrogen chloride over the chromium oxide catalyst, when the time factor is taken into consideration, the actual rate of production of chlorine, i. e., pounds per hour or tons per day, is found to be too low for commercial operations unless an impractically large number of producing units are employed.

The present invention

It has now been found that not all forms of the so-called "sesquioxide of chrome" ($Cr_2O_3$) are of like catalytic activity in the oxidation of hydrogen chloride employing elemental oxygen as the oxidizing agent. In general, it has been found that where the history of a mass of chromic oxide shows that at some time during its existence the material has been heated to temperatures in excess of 500° C., the catalytic activity thereof in the oxidation of hydrogen chloride is lost to such an extent that only extremely low rates of production of chlorine are obtainable. On the other hand, it has been found that where the chromic oxide is prepared synthetically, for example, from a solution of chromic acid in water, from which solution the chromic acid may be adsorbed by a suitable inert substrate and is thereafter reduced to chromic oxide by means of hydrogen or other suitable reducing agent, a very active form of amorphous chromic oxide is obtained, which form is especially effective in the oxidation of hydrogen chloride employing elemental oxygen as the oxidizing agent. Moreover, it has been found that this same amorphous, highly catalytically active form of chromic oxide, when heated to temperatures substantially in excess of 500° C., gradually undergoes a physical transformation during which the material appears to glow, i. e., reach a state of incandescence, and changes to a crystalline form of the oxide, which crystalline form is substantially inactive catalytically in the oxidation of hydrogen chloride.

The two forms of chromic oxide are readily identified by visual inspection, the catalytically active, amorphous form possessing a dark, bluish-green coloration; this amorphous form of the oxide which has not undergone the above-described transformation through incandescence to the bright green, crystalline form is referred to in the chemical arts as "dark, unglowed" chromic oxide. It is the dark, bluish-green, amorphous, unglowed form of chromic oxide which is employed as the oxidation catalyst in the method of the present invention.

It is one of the objects of the present invention to provide a method for the oxidation of hydrogen chloride to elemental chlorine in which the oxidation catalyst employed is a stable, non-volatile compound.

Another object of the invention is to provide a method for the oxidation of hydrogen chloride in which a high time-rate of production of chlorine is obtained.

A still further object of the invention is to provide a method for the catalytic oxidation of hydrogen chloride to chlorine, in which method a specific physical form of chromic oxide is employed as the oxidation catalyst.

In general, the method of the present invention includes the steps of passing a gaseous stream containing oxygen and hydrogen chloride over a body of catalyst material consisting of dark, unglowed chromic oxide and an inert carrier, maintaining said catalyst material at a temperature substantially within the range of 340° to 480° C., and recovering the chlorine produced.

Preparation of the catalyst

The body of oxidation catalyst material employed in the method of the present invention preferably contains the dark, unglowed form of chromic oxide described hereinabove associated with an inert, inorganic carrier material, which carrier is preferably a substance having a relatively high degree of porosity. Commercial chromic oxide, which has a dark, bluish-green coloration and which is customarily employed for pigment purposes, has been found suitable in the method of the present invention, although such form of chromic oxide does not always possess the high degree of catalytic activity exhibited by chromic oxide prepared from a chromium compound readily reducible to catalytically active chromic oxide at temperatures below 500° C., since the commercial chromic oxides may contain mixtures of various physical forms of the compound which may have been subjected to temperatures above the "glow" temperature at some time during their manufacture.

Dark, unglowed chromic oxide is readily prepared from purified chromic acid by heating a body of chromic acid at a temperature above 100° C., but below temperatures substantially in excess of 400° C. to convert the chromic acid to chromium trioxide, which oxide is then readily reducible, suitably with gaseous reducing agents, preferably hydrogen, at temperatures within this range to the desired dark, unglowed chromic oxide. The reduction of the chromium trioxide to chromic oxide with hydrogen is preferable for the purposes of the present invention since reduction with hydrogen leaves substantially no impurities within the body of oxide material to inhibit its catalytic activity. In preparing the body of catalyst material, the dark, unglowed chromic oxide may be chemically deposited in situ upon the surfaces and within interstices of an inert, porous carrier, or it may be prepared apart from the carrier material as relatively large particles or mass which may be subsequently ground to a suitable fineness.

Chemical deposition of dark, unglowed chromic oxide is suitably effected by dissolving chromic acid in water, the amount of chromic acid employed depending upon the amount of chromic oxide desired in the ultimate body of catalyst material, immersing a mass of particles of the porous, inert carrier in the solution, subsequently dehydrating the chromic acid deposit to chromium trioxide, and reducing the trioxide, suitably by passing a reducing gas over the mass particles at a temperature not in excess of 400° C.

In addition, dark, unglowed chromic oxide in the form of a fine powder may be associated with inorganic, inert carrier material in the form of an aqueous slurry of the two components, after which the mixture is dried and broken up into lumps of suitable size for use in the reactor.

A further method for combining the dark, unglowed chromic oxide with the inert carrier comprises forming an aqueous slurry of the dark, unglowed chromic oxide ground to suitable fineness and immersing pellets or relatively large particles of the inert, inorganic material in the aqueous slurry, whereby the finer particles of the dark, unglowed chromic oxide are physically deposited upon the outermost surfaces of the pellets or particles of the carrier material. Thereafter, excess water is drained from the mass of catalyst particles and the material dried at temperatures not in excess of about 400° C.

Substances which have been found suitable as supports or carriers for the dark, unglowed chromic oxide in the method of the present invention include pumice, silica, silica gel, alumina, clay, activated alumina, synthetic co-precipitated silica alumina, and the like. Of these, alumina or activated alumina are preferred since these materials tends to inhibit the glow phenomenon of chromic oxide appreciably, i. e., the temperature at which the glow phenomenon is initiated is higher when the chromic oxide is associated with alumina or activated alumina.

The body of catalyst material may be employed in a reactor in the form of a fixed bed of the material through which a mixture of hydrogen chloride and an oxygen containing gas is passed, or the catalyst material may be ground to the suitable fineness and the gas stream passed through the bed of fine particles at such a rate that the particles are buoyantly supported by and suspended in the stream of reactants and reaction products, which latter method is known in the chemical arts as fluidization. The fluidization technique offers certain advantages over the fixed bed technique in catalytic reactions, the principal advantage being that better and more uniform temperature control for the reaction is obtained.

Use of catalyst

In accordance with the method of the present invention, a mixture of hydrogen chloride and oxygen or an oxygen containing gas, such as air, or oxygen gas diluted with nitrogen or other inert gaseous material, is passed over the mass of dark, unglowed chromic oxide catalyst at a temperature within the range of 340° to 480° C. The amount of oxygen may suitably be maintained within the ratio of 0.4 to 2.5 equivalents of oxygen per mol of hydrogen chloride, preferably within the range of 0.8 to 1.25 equivalents of oxygen per mol of hydrogen chloride. Since air contains 21% oxygen by volume and since one mol of hydrogen chloride requires ¼ mol of oxygen to effect its oxidation to chlorine and water, one volume of hydrogen chloride requires 1.19 volumes of air theoretically to effect its oxidation. Therefore, where air is employed as the oxidizing agent for the hydrogen chloride, the actual ratio of the volume of hydrogen chloride gas to air, on the basis of the above-stated equivalent ratios of oxygen to hydrogen chloride, will be within the range of 1:0.48–1:3, preferably within the range of 1:0.95–1:1.5. While ratios of hydrogen chloride to air greater than or less than those given above may be employed in the method of the present invention, where greater amounts of air are used, the problem of separation of the inert and unreacted gases from the chlorine issuing from the reactor assumes considerable magnitude, and unless extremely efficient methods of recovering the elemental chlorine produced are available, it is preferable in the practice of the method of the present invention to employ the ratios of hydrogen chloride to air given above.

The rate at which the mixture of gaseous hydrogen chloride and oxygen containing gas is fed to the reactor governs the production rate of a given chlorine producing unit. It has been found suitable in the method of the present invention to feed the gaseous mixture to the reactor at the rate of 300 to 750 volumes of the mixture of hydrogen chloride and oxygen containing gas per volume of catalyst per hour. Within the above range, the conversion of hydrogen chloride to chlorine has been found to vary from about 60% to about 75% at temperatures of the order of 400° to 425° C. Although feed rates higher than the above indicated rates may be employed in the method of the present invention, it has been found that where the feed rate is substantially above 750 volumes of the feed gas per volume of catalyst per hour, the amount of hydrogen chloride converted to chlorine decreases fairly rapidly. However, at these higher feed rates, the production rate of chlorine, i. e., pounds per hour or tons per day, does not decrease at the same rate at which the conversion decreases. Hence, where extremely efficient methods of separation and recovery of chlorine from the inert atmosphere gases and unreacted hydrogen chloride issuing from the reactor are available, it is advantageous to operate at the higher feed rates.

The recovery and separation of chlorine produced and unreacted hydrogen chloride may be effected in any of several ways well known in the art, such as passing the gaseous effluent from the reactor over cool surfaces whereby water and most of the hydrogen chloride, which is readily dissolved therein, are condensed, and subsequently passing the gaseous effluent from this condensation in countercurrent contact with a chlorine dissolving liquid, such as carbon tetrachloride, whereby the chlorine is absorbed and the inert gases and unreacted oxygen are separated from the chlorine. The hydrogen chloride recovered may be recycled to the reactor with additional amounts of hydrogen chloride from other sources and with further amounts of a suitable oxygen containing gas.

In order that those skilled in the art may better understand the method of the present invention, the following specific examples are offered:

*Example I*

A body of catalyst material is prepared in the following manner:

53½ parts by weight of powdered aluminum oxide are mixed with water to form a thick slurry, and to this slurry 56½ parts by weight of commercial, dark, unglowed (dark, bluish-green coloration) chromic oxide, ground to a fineness of 100–300 mesh, are added and the whole mass vigorously agitated until a uniform mixture is obtained. Thereafter, the excess water is separated from the mixture, leaving a thick, plastic mass, which plastic mass is dried in an oven at 110° C. for a period of 16 hours. The dried mass is friable and is broken up into lumps ranging in size from 4–18 mesh. 100 gms. of this catalyst material are placed in a 1-inch (inside diameter) quartz reaction tube and indirectly heated by means of a tubular electric furnace to a temperature within the range of 420° to 430° C. A mixture of hydrogen chloride and air is passed through the quartz tube containing the body of catalyst material, the ratio of the volume of hydrogen chloride to air being 1:1.19, with the following results: When the gaseous mixture is fed to the reactor at a rate within the range of 150 cc. per hour per gram of catalyst to 380 cc. per hour per gram of catalyst, the conversion of hydrogen chloride to chlorine is maintained at approximately 68% of theory, and at higher feed rates, begins to decrease, until at a feed rate of 530 cc. per hour per gram of catalyst, the conversion of hydrogen chloride to chlorine is 64% of theory.

Two other catalysts containing 28% of the dark, unglowed chromic oxide, and 20% of dark, unglowed chromic oxide respectively, are prepared in precisely the same manner as that described in the fore part of the example, and a mixture of hydrogen chloride and air in the same ratio (1:1.19) is fed to the reactor at rates within the range followed in the fore part of the example, with the result that the conversion of hydrogen chloride to chlorine for both of these catalysts is of the order of 67% of theory up to feed rates of 300 cc. per hour per gram of catalyst, after which the per cent conversion for the catalyst containing 20% of dark, unglowed chromic oxide begins to decrease slowly up to a feed rate of 500 cc. per hour per gram of catalyst, at which latter feed rate the per cent conversion of hydrogen chloride to chlorine has dropped off to 62%. The catalyst containing 28% of dark, unglowed chromic oxide maintains its capacity to catalyze the conversion of hydrogen chloride to chlorine in the presence of oxygen up to a feed rate of approximately 400 cc. per hour per gram of catalyst, at which rate the per cent conversion begins to fall off rather slowly until at a feed rate of 500 cc. per hour per gram of catalyst, the conversion has decreased to 64%.

*Example II*

A body of catalyst material for the oxidation of hydrogen chloride to chlorine and water is prepared by dissolving 39 parts of chromium trioxide ($CrO_3$) in 150 ml. of water and adding to this solution 70 gms. of 8–14 mesh activated aluminum oxide. All of the solution is absorbed by the porous activated aluminum oxide and the mass is placed in a suitable container and heated in an oven over-night at 170° C. in order to remove the excess moisture therefrom. The dried porous catalyst mass is then heated to 200° C. and hydrogen passed thereover for a period of 4 hours. This catalyst material is employed in the same reactor as that described in Example I above. A mixture of hydrogen chloride and air in the ratio of one volume of hydrogen chloride per 1.2 volumes of air is passed over the body of catalyst material at a temperature of 425° C. with the following results:

| T, °C. | V. Feed Gas / V. Cat./Hr. | Percent Conversion | Production | |
|---|---|---|---|---|
| | | | Gms. Cl$_2$ / Gms. Cat./Hr. | Gms. Cl$_2$ / Gms. Cr$_2$O$_3$/Hr. |
| 425 | 340 | 67.4 | 0.15 | 0.50 |
| 425 | 532 | 64.8 | 0.23 | 0.76 |
| 425 | 680 | 63.0 | 0.30 | 1.0 |

*Example III*

In precisely the same manner as that described in Example II above, a body of catalyst material containing 10% of dark, unglowed chromic oxide is prepared from 13 gms. of chromium trioxide (CrO$_3$) dissolved in 30 ml. of water, to which there is added 90 gms. of 14–18 mesh porous aluminum oxide pellets. The coated aluminum oxide pellets are dried overnight at 110° C., subsequently heated to 180° C., and gaseous hydrogen passed thereover for a period of 4 hours.

A feed gas having the same composition as described in Example II above is passed over the body of catalyst material placed in a 1-inch (inside diameter) quartz tube and indirectly heated by means of an electric furnace, with the following results:

| T, °C. | V. Feed Gas / V. Cat./Hr. | Percent Conversion | Production | |
|---|---|---|---|---|
| | | | Gms. Cl$_2$ / Gms. Cat./Hr. | Gms. Cl$_2$ / Gms. Cr$_2$O$_3$/Hr. |
| 425 | 340 | 64.3 | 0.14 | 1.4 |
| 425 | 532 | 64.7 | 0.23 | 2.3 |
| 425 | 680 | 62.2 | 0.29 | 2.93 |

*Example IV*

A catalyst mass containing 5% of the dark, unglowed chromic oxide deposited upon porous activated aluminum oxide is prepared in precisely the same manner as that described in Examples II and III, the only variation being in the amount of chromium trioxide (CrO$_3$) employed. The subsequent treatment after the adsorption of the solution of chromium trioxide upon the activated aluminum oxide is precisely that described in Examples II and III above. A feed gas containing one volume of hydrogen chloride per 1.2 volumes of air is passed over the body of catalyst material heated to a temperature of 425° C., with the following results: At the rate of 340 volumes of feed gas per volume of catalyst per hour, the amount of hydrogen chloride converted to chlorine is 62.6% of the theoretical amount; the amount of chlorine produced is 0.135 gm. of chlorine per gram of catalyst per hour.

*Example V*

40 parts of commercial, dark, unglowed chromic oxide are placed in a suitable container and slurried with 60 ml. of water. This mixture is then stirred with a mechanical stirrer, while 105 gms. of powdered aluminum oxide are slowly added thereto, whereupon the mixture becomes a thick, putty-like mass, which is dried over-night in an oven at 110° C. The mass of aluminum oxide and the dark, unglowed chromic oxide dries to a hard, porous mass, which is then broken into small lumps of a fineness of about 4–8 mesh. The lumps of catalyst are placed in a 1-inch (inside diameter) quartz tube indirectly heated in a tubular electric furnace. By conducting the reaction at various temperatures and noting the effect thereof upon the conversion of hydrogen chloride to chlorine, when a feed gas containing one volume of hydrogen chloride per 1.52 volumes of air is passed through the reactor at the rate of 65 cc. per gram of catalyst per hour, the following results are obtained:

| T., °C. | Percent Conversion |
|---|---|
| 340 | 52 |
| 370 | 63 |
| 400 | 72 |
| 425 | 73 |
| 482 | 66 |

Above 490° C., the amount of hydrogen chloride converted to chlorine is less than 65% and falls off very rapidly as the temperature is increased. This temperature is approximately within the lower portion of the range in which the glow phenomenon is normally exhibited by dark, unglowed chromic oxide and after which the catalytic activity of the chromic oxide for the oxidation of hydrogen chloride rapidly decreases.

*Example VI*

61 grams of dark, unglowed chromic oxide (A. C. S. reagent grade, having a dull, dark, bluish-green coloration) and 113 grams of finely ground pumice are slurried together in water to form a thick plastic pulp. The moist pulp is dried in an oven over-night at 100° C., after which it is broken up into particles ranging in fineness from 10–20 mesh with some smaller particles of "fines" of about 100 mesh or more.

This catalyst is placed in a reactor of the same design as that described in Example I above and a gas stream containing 78 volume per cent of hydrogen chloride and 22 volume per cent of oxygen is passed over the body of catalyst at the rate of 60 liters per hour, while the temperature of the catalyst body is maintained at 480° C., and the following data obtained:

Vol. Feed Gas / Vol. Cat./Hr. ---------- 300

Percent conversion -------------- 66

Gms. Cl$_2$ / Gms. Cat./Hr. ---------- 0.14

Gms. Cl$_2$ / Gms. Cr$_2$O$_3$/Hr. ---------- 0.40

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of oxidizing hydrogen chloride to chlorine and water, which consists of continuously passing a gaseous stream containing a mixture of oxygen and hydrogen chloride over a body of catalyst material prepared at a temperature of below 500° C. and consisting of unglowed chromic oxide and an inert carrier, continuously maintaining said catalyst material at a temperature substantially within the range of 340° to 480° C. during the oxidation of said hydrogen chloride, and recovering the chlorine produced.

2. The method of oxidizing hydrogen chloride to chlorine and water, which consists of the steps of continuously passing a gas stream containing a mixture of oxygen and hydrogen chloride over a body of chromic oxide prepared at temperatures above 100° C. but not substantially in excess of 400° C., said body being maintained during the oxidation of said hydrogen chloride at a temperature within the range of 340° to 480° C., and recovering the chloride produced, the temperature to which the catalyst is heated being continuously maintained both during preparation and use at below 500° C.

3. The method of oxidizing hydrogen chloride to chlorine and water, which consists of the steps of continuously passing a gaseous stream containing a mixture of oxygen and hydrogen chloride over a body of catalyst material consisting of unglowed chromic oxide chemically deposited upon particles of an inert inorganic carrier, continuously maintaining said body at a temperature within the range of 340° to 480° C. during the oxidation of said hydrogen chloride, and recovering the chlorine produced, the said chromic oxide during its synthesis, preparation as a catalyst, or use in oxidizing hydrogen chloride being continuously maintained at temperatures below 500° C.

4. The method of oxidizing hydrogen chloride to chlorine and water, which includes the steps of passing a gaseous stream containing a mixture of air and hydrogen chloride over a body of catalyst material consisting of dark, unglowed chromic oxide chemically deposited upon particles of an inert inorganic carrier by impregnating a mass of said particles with a solution of chromic acid and thereafter reducing the chromic acid to an oxide of trivalent chromium at a temperature above 100° C. but not substantially in excess of 400° C., maintaining said catalyst at a temperature within the range of 340° to 480° C. during the passage of said gaseous stream thereover, and recovering the chlorine produced.

5. The method of claim 4 in which the inert inorganic carrier is activated aluminum oxide.

6. The method of claim 4 in which the chromic acid is first dehydrated to chromium trioxide and said chromium trioxide is reduced to chromic oxide by reduction in an atmosphere of hydrogen at a temperature above 100° C. but not substantially above 400° C.

7. The method of claim 4 in which the catalyst consists of 10% to 50% of dark, unglowed chromic oxide and 50% to 90% of activated alumina.

8. The method of claim 4 in which the volume ratio of hydrogen chloride to air is substantially within the range of 1:0.95 to 1:3.

9. The method of claim 4 in which the volume of the stream of hydrogen chloride and air is passed over the body of catalyst at the rate of 300 to 750 volumes of the mixture per volume of catalyst per hour.

References Cited in the file of this patent

UNITED STATES PATENTS

| Number | Name | Date |
|---|---|---|
| 2,351,094 | Blaker | June 13, 1944 |
| 2,451,870 | Richardson et al. | Oct. 19, 1948 |

OTHER REFERENCES

J. W. Mellor's "Modern Inorganic Chemistry," page 566. Single Vol. Ed. New Impression of Eighth Ed., January 1935, Longmans, Green and Co., N. Y.

J. W. Mellor's "Inorganic and Theoretical Chemistry," vol. 11, pages 177–179; 1931 Ed., Longmans, Green and Co., New York.